(12) United States Patent
Lebeault et al.

(10) Patent No.: US 12,291,978 B2
(45) Date of Patent: May 6, 2025

(54) BYPASS TURBOMACHINE FOR AN AIRCRAFT

(71) Applicant: SAFRAN AIRCRAFT ENGINES, Paris (FR)

(72) Inventors: Eva Julie Lebeault, Moissy-Cramayel (FR); Anthony Binder, Moissy-Cramayel (FR); Laurent Soulat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/753,045

(22) PCT Filed: Aug. 26, 2020

(86) PCT No.: PCT/FR2020/051502
§ 371 (c)(1),
(2) Date: Feb. 16, 2022

(87) PCT Pub. No.: WO2021/038169
PCT Pub. Date: Mar. 4, 2021

(65) Prior Publication Data
US 2022/0333495 A1 Oct. 20, 2022

(30) Foreign Application Priority Data
Aug. 29, 2019 (FR) ...................................... 1909518

(51) Int. Cl.
*F01D 7/00* (2006.01)
*F01D 1/30* (2006.01)
(Continued)

(52) U.S. Cl.
CPC ................ *F01D 7/00* (2013.01); *F01D 1/30* (2013.01); *F01D 17/105* (2013.01); *F02C 6/08* (2013.01);
(Continued)

(58) Field of Classification Search
CPC . F01D 17/105; F01D 7/00; F01D 1/30; F02K 1/56; F02K 1/64; F02K 1/66;
(Continued)

(56) References Cited

U.S. PATENT DOCUMENTS 3,476,486 A * 11/1969 Chilman .................... F02K 1/66
416/157 R
3,964,257 A * 6/1976 Lardellier ............. F04D 27/023
60/39.23
(Continued)

FOREIGN PATENT DOCUMENTS

EP 3205868 A1 8/2017

OTHER PUBLICATIONS

International Search Report received for PCT Patent Application No. PCT/FR2020/051502, mailed on Nov. 24, 2020, 5 pages (2 pages of English Translation and 3 pages of Original Document).

Primary Examiner — Woody A Lee, Jr.
Assistant Examiner — Jesse M Prager
(74) Attorney, Agent, or Firm — WOMBLE BOND DICKINSON (US) LLP (57) ABSTRACT

The invention relates to a bypass turbomachine (2) for an aircraft, comprising a gas generator (5) and a ducted fan (4) comprising variable pitch blades (18) configured to take a reverse thrust position driving a reverse flow (24) of air within a secondary duct (16), the gas generator (5) being connected to a fan casing (3) by a stator blade assembly (40) that passes through the secondary duct, first openings (28) for letting in air from the reverse flow being located on an outer casing (17) at least partially internally delimiting the outer duct, and second openings (29) for letting said air out being located on an inner casing (14) at least partially externally delimiting an inner duct (12). The first openings are located within a plane that is perpendicular to a longi-
(Continued)

tudinal axis (C) of the turbomachine and passes substantially through the middle of the blade assembly.

2 Claims, 13 Drawing Sheets

(51) Int. Cl.
  *F01D 17/10*  (2006.01)
  *F02C 6/08*  (2006.01)
  *F02K 1/56*  (2006.01)
  *F02K 1/66*  (2006.01)
  *F02K 3/075*  (2006.01)
(52) U.S. Cl.
  CPC ................. *F02K 1/56* (2013.01); *F02K 1/66* (2013.01); *F02K 3/075* (2013.01); *F05D 2220/323* (2013.01); *F05D 2240/12* (2013.01); *F05D 2240/30* (2013.01); *F05D 2260/606* (2013.01)
(58) Field of Classification Search
  CPC ...... F02K 1/68; F02K 3/075; F05D 2220/323; F05D 2240/12; F05D 2260/606; F02C 6/08; F02C 9/18
  See application file for complete search history.

(56) References Cited

U.S. PATENT DOCUMENTS

| | | |
|---|---|---|
| 4,371,132 A | 2/1983 | Woodward |
| 2018/0135557 A1 | 5/2018 | Pouyau et al. |

\* cited by examiner

BYPASS TURBOMACHINE FOR AN AIRCRAFT

TECHNICAL FIELD OF THE INVENTION

The present invention relates to a bypass turbomachine for an aircraft.

TECHNICAL BACKGROUND

A propulsion assembly comprises, for example, a bypass turbomachine integrated in a nacelle, the turbomachine comprising, from upstream to downstream, at least one fan and a gas generator comprising, for example, one or more compressor stages, low pressure and high pressure, a combustion chamber, one or more turbine stages, high pressure and then low pressure. In a mode of operation referred to as "thruster" of the propulsion assembly, for example when the aircraft is in cruise, the air flow generated by the fan is divided, by a separator (or flow-splitting nose), into a primary air flow and a secondary air flow circulating from upstream to downstream. More precisely, the primary flow flows in an annular primary duct of the gas generator and the secondary air flow flows in an annular secondary duct delimited radially between the gas generator and the nacelle, and participating in a preponderant way in the thrust provided by the propulsion assembly. By convention, in this application, the terms "upstream" and "downstream" are defined with respect to the direction of gas flow in the propulsion assembly when the latter is operating in "thruster" mode. Also, by convention in the present application, the terms "inner" and "outer" are defined radially with respect to the longitudinal axis of the turbomachine, which is in particular the axis of rotation of the rotors of the compressors and of the turbines. In order to reduce the fuel consumption of the propulsion assembly, the engine manufacturers are continually seeking to increase the dilution ratio, commonly referred to as the BPR (ByPass Ratio) of the propulsion assembly, which is the ratio of the air flow rate in the secondary duct and in the primary duct. To meet this objective, it is possible in particular to have a fan equipped with variable pitch blades in order to adjust the pitch (and more precisely the pitch angle) of the blades according to the flight parameters, and thus, in a general way, to optimize the operation of the propulsion assembly. The fact of having variable pitch blades also allows, in a mode of operation referred to as "reverse", to use the latter to generate a counter-thrust, and thus to participate in the slowing down of the aircraft in addition to the brakes so as to reduce its braking distance during landing. Thus, in the thruster mode of operation, the pitch of the vanes of the fan is generally considered to be positive and, in the reverse mode of operation, the pitch of the vanes is generally considered to be negative. Unlike a fan with fixed blade pitch, which requires the addition of thrust reversers (e.g., reversers with pivoting doors and/or sliding covers incorporated in the nacelle) to generate this counter-thrust when the aircraft lands, a turbomachine comprising a fan with variable blade pitch does not comprise thrust reversers in its structure, to the benefit of the mass of the turbomachine. In reverse operating mode, the secondary flow circulates from downstream to upstream in the secondary duct, a first portion of the secondary flow being used to feed the primary duct of the gas generator in which the air flow always circulates from upstream to downstream, a second portion of the secondary flow escaping from the propulsion assembly via the fan so as to generate a counter-thrust. By feedback, in reference to the first portion of the secondary flow entering the primary duct bypassing the flow-splitting nose, we note the appearance of areas of separation of the air flow at the level of the nose. In reverse operating mode, these separation areas strongly degrade the efficiency of the gas generator and of the turbomachine in general. Depending on the engine speed used, these areas of separation can jeopardize the operation of the gas generator.

The present invention is intended to solve in particular some or all of the above problems.

SUMMARY OF THE INVENTION

To this end, the invention proposes a bypass turbomachine for an aircraft, the turbomachine comprising a ducted fan and a gas generator, the fan being configured to generate a primary flow of air in a primary duct inside the gas generator, and a secondary flow in a secondary duct extending around the gas generator and inside a fan casing, the fan comprising variable pitch vanes which are able to adopt a reverse thrust position driving a flow of a reverse flow of air in the secondary duct, the gas generator being connected to the fan casing by a stator vane assembly which passes through the secondary duct, the gas generator comprising two annular casings, outer and inner respectively, extending around each other, the outer casing at least partially internally delimiting the secondary duct and being connected to the stator vane assembly, and the inner casing at least partially externally delimiting the primary duct, the turbomachine further comprising first openings for letting in air from the reverse flow being located on the outer casing, and second openings for letting this air out being located on the inner casing, characterised in that at least one portion of said first openings is located in a plane perpendicular to a longitudinal axis of the turbomachine passing through an area located in the middle of said vane assembly along an axial direction, and in that flaps are provided at the level of said first and second openings and are movable between positions of closure and of release of these openings, said flaps being pivotally movable, having a scooping function and being configured to extend at least partially into said secondary duct when in the release position so that the radially outer ends of the flaps are located at a radial dimension in the secondary duct that is between 20 and 30% of the total radial dimension of this duct, these dimensions being measured from the outer casing in line with these ends.

According to the invention, said first openings are located in a plane perpendicular to a longitudinal axis of the turbomachine passing substantially in the middle of said vane assembly.

The first and second openings as well as the positioning of the first openings with respect to said vane assembly not only allow to optimize the flow of the air flow taken during the passage from the secondary duct to the primary duct but also to provide the adequate air flow rate in the primary duct when the turbomachine is operating in "reverse" mode, to the benefit of the efficiency and the service life of the turbomachine.

The turbomachine according to the invention may comprise one or more of the following characteristics, taken alone from each other or in combination with each other:
  guide fins are located in said first openings and/or in said second openings and/or between said first and second openings; and
  the stator vane assembly comprises structural arms and flow straightening vanes, the arms comprising trailing edges downstream of the trailing edges of the vanes with respect to said primary flow, said first openings being located between the arms and at least partly downstream of the trailing edges of the vanes.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
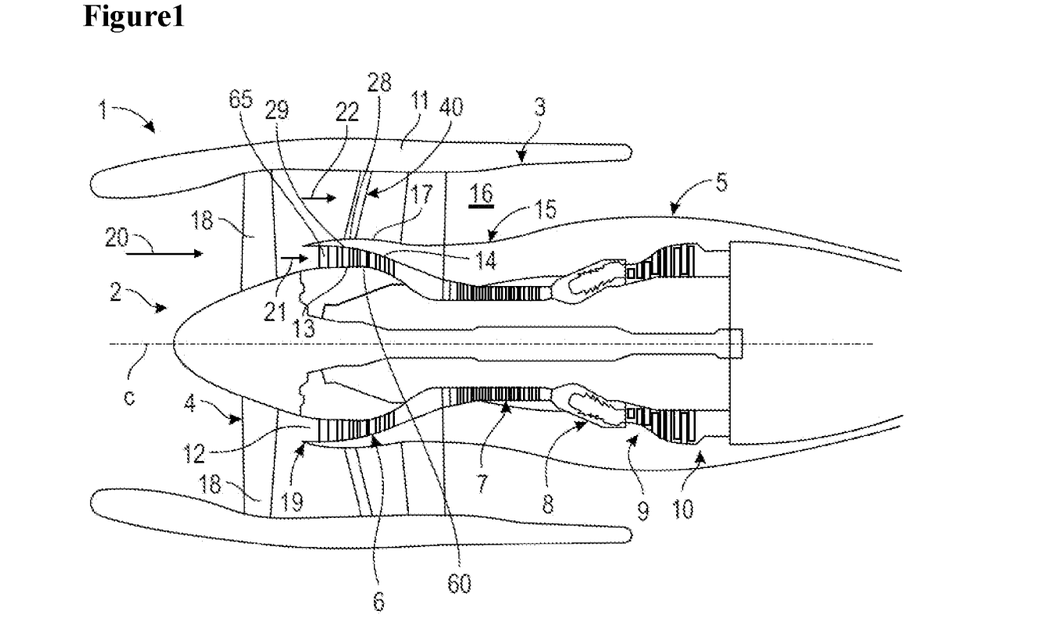
FIG. 1 is a schematic view, in longitudinal section, of a propulsion assembly comprising a turbomachine operating in a mode referred to as "thruster"

FIG. 1 shows a propulsion assembly 1, in particular for an aircraft, comprising a nacelle 11 and a bypass turbomachine 2 integrated into a fan casing 3, the turbomachine 2 comprising, from upstream to downstream, a ducted fan 4 and a gas generator 5 comprising several compressor stages, low pressure 6 and high pressure 7, a combustion chamber 8, and several turbine stages, high pressure 9 and then low pressure 10. The gas generator 5 comprises an outer casing 17 and an inner casing 14 extending around each other and joining at the level of a nose 19. The inner casing 14 and the outer casing 17 have an axis C of revolution coinciding with a longitudinal axis of the turbomachine 2, which is in particular the axis of rotation of the rotors of the fan 4, the compressors 6, 7 and the turbines 9, 10.

The turbomachine 2 also comprises, on the one hand, an annular primary duct 12 of the gas generator 5 delimited radially between a casing 13 of the movable rotors of the turbomachine 2 and the inner casing 14, and, on the other hand, an annular secondary duct 16 delimited radially between the outer casing 17 and the fan casing 3. The outer casing 17 thus delimits internally at least partially the outer duct 16, and the inner casing 14 delimits at least partially externally the inner duct 12. In the following description, the air flows circulating in the primary and secondary ducts 12, 16 are referred to as primary flow and secondary flow respectively. The inlets and outlets of these inner 12 and outer 16 ducts are configured to limit the curvature variations and avoid separations of the primary and secondary flows.

The gas generator 5 in particular at the level of its outer casing 17, is connected to the fan casing 3 by a stator vane assembly 40 which passes through the secondary duct 16.

The fan 4 is surrounded by the fan casing 3 and comprises variable pitch vanes 18 which are capable of adopting a reverse thrust position driving a flow of a reverse airflow into the secondary duct 16. The pitch of a vane is quantified via the pitch angle which corresponds to the angle, in a longitudinal plane (which may be normal to the radial direction of the vane), between the chord of the vane 18 and the plane of rotation of the fan 4. FIG. 1 shows the turbomachine 2 operating in "thruster" mode. An air flow 20 generated by the fan 4 (circulating from upstream to downstream) is divided by the flow-splitting nose 19 separating the primary 12 and secondary 16 ducts into a primary air flow 21 and a secondary air flow 22 circulating from upstream to downstream. The primary air flow 21 thus circulates through the primary duct 12 inside the gas generator 5 and the secondary air flow 22 circulates through the secondary duct 16. The secondary flow 22 participates in a preponderant way in the thrust provided by the turbomachine 2. The pitch angle of the vanes 18 of the fan 4 is positive, the primary 21 and secondary 22 flows generating a positive thrust, i.e. a thrust whose axial resultant is oriented from the downstream to the upstream. This mode of operation is used, for example, when the aircraft is in the take-off and/or cruise phase.

Figure 2:
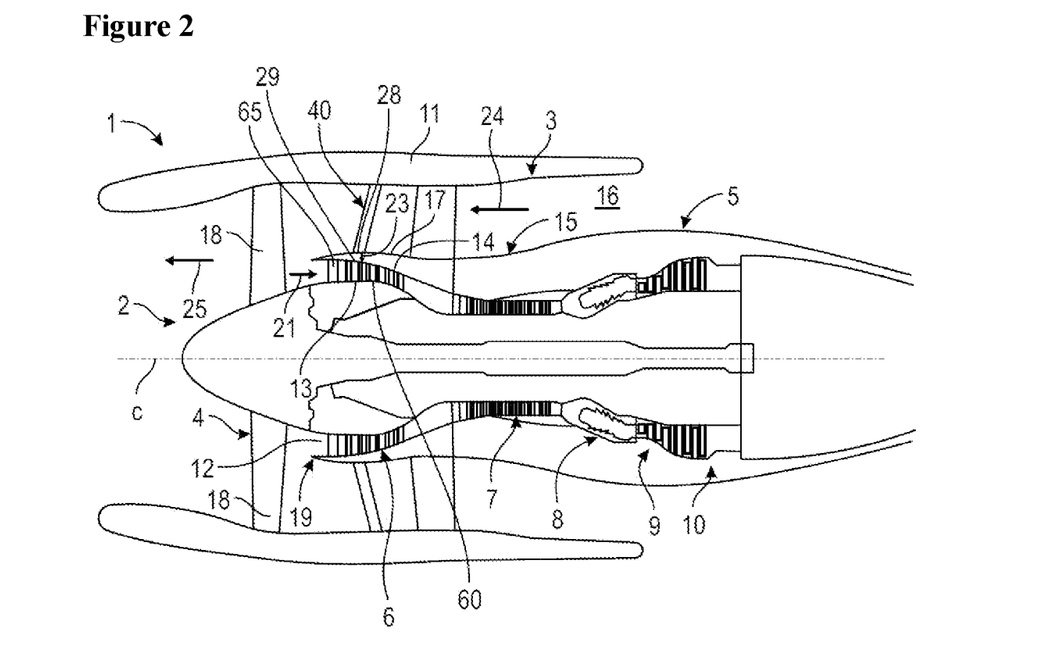
FIG. 2 is a schematic view, in longitudinal section, of the propulsion assembly comprising a turbomachine operating in a mode referred to as "reverse"

FIG. 2 shows the turbomachine 2 operating in "reverse" mode. The pitch angle of the vanes 18 of the fan 4 is negative. The fan 4 then generates a reverse secondary air flow 24 circulating from downstream to upstream in the secondary duct 16. A first portion 23 of the reverse secondary flow 24 is used to feed the primary duct 12 of the gas generator 5 in which the primary air flow 21 always circulates from upstream to downstream. A second portion 25 of the secondary reverse flow 24 escapes from the turbomachine 2 via the fan 4 so as to generate a negative thrust (or counter-thrust), i.e. a thrust whose axial resultant is oriented from upstream to downstream, and thus to participate in the slowing down of the aircraft in addition to the brakes so as to reduce its braking distance during landing. This reversal of the direction of the flow is mainly achieved by means of cuts located between 30% and 100% of the height of the variable pitch vanes 18 (the vane heights being measured radially with respect to the longitudinal axis C of the turbomachine, from their radially inner roots or ends). On the other hand, this new pitch implies a mismatch of the cuts at the root of the vanes (from 0% to 30% of the height of the vanes with variable pitch 18) with respect to the primary flow located just downstream, inducing an obstruction. The flow from upstream of the turbomachine 2 may no longer properly feed the primary flow, and it is therefore important that the first portion 23 of the reverse secondary flow 24 used to feed the primary duct 12 of the gas generator 5 is properly directed into the primary duct 12. To this end, the turbomachine 2 comprises in particular first openings 28 for letting in air from the reverse secondary flow 24 located on the outer casing 17, and second openings 29 for letting this air out being located on the inner casing 14 and configured to feed the primary duct 12 when the turbomachine 2 is operating in reverse mode. According to the invention, the first openings 28 are located in a plane P perpendicular to the longitudinal axis C of the turbomachine 2 passing substantially through the middle of the vane assembly 40. By "middle" of the vane assembly, we mean an area located substantially in the middle of the vane assembly 40 along an axial direction.

The first portion of the air flow 23 can therefore enter the gas generator 5 directly at the level of the vane assembly 40. The first portion of the airflow 23 enters the primary duct before a vane assembly 60 connecting the inner casing 14 to the casing 13 of the movable rotors. It is not necessary for the first portion of airflow 23 to arrive in the primary duct upstream of a straightener 65 that typically straightens the flow deflected by the variable pitch vanes 18. The number of first and second openings, 28, 29 their lengths and their axial distributions will depend on the flow rate requirement of the gas generator 5 in reverse operation.

As best seen in FIGS. 3 to 13, the turbomachine 2 comprises, for example, first and second flaps 31, 32. In particular, they are provided respectively at the level of the first 28 and second 29 openings and are movable between positions of closure (FIG. 3) and release (FIGS. 4 to 13) of these openings 28, 29.

Figure 3:
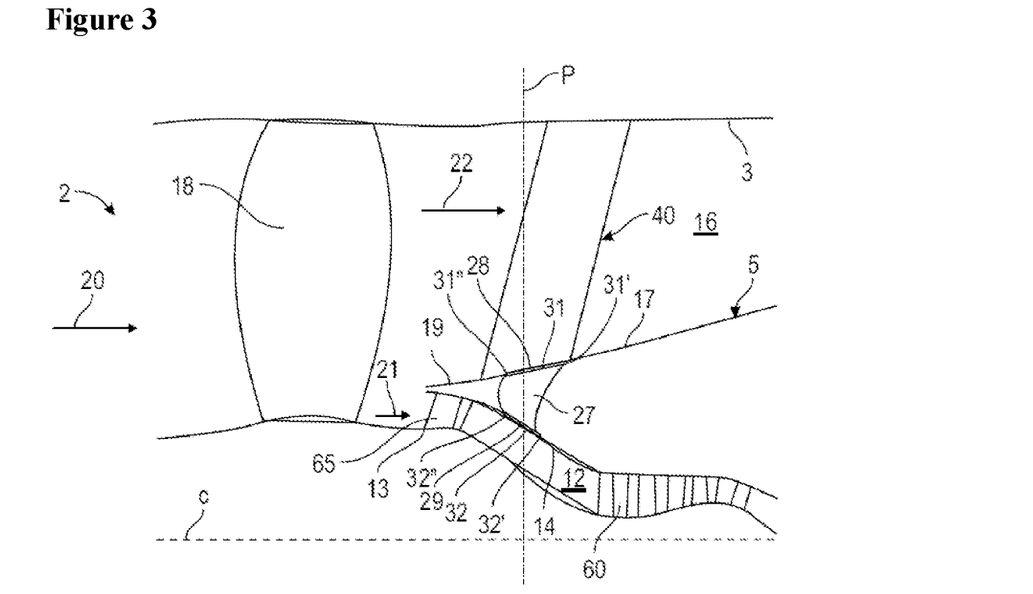
FIG. 3 is a partial schematic view, in longitudinal section, of a variant embodiment of a turbomachine according to the invention.

On FIG. 3, we notice that the first and second flaps 31, 32 are in closed positions. By closed position is meant a position in which the first and second flaps 31, 32 completely close the first and second openings 28, 29 respectively. That is, the first and second openings 28, 29 are made airtight by the flaps 31, 32. This closed position corresponds in particular to a "thruster" operating mode of the turbomachine 2 illustrated in FIG. 1. The first and second flaps 31, 32 respectively comprise downstream ends 31', 32' and upstream ends 31", 32" defined when the first and second flaps 31, 32 are in closed position.

According to the embodiments of the invention illustrated in FIGS. 4 to 9, the first and second flaps 31, 32 are for example pivotally movable. It is understood here that they move from the release position to the closed position and vice versa by one or more pivot movements.

Figure 4:
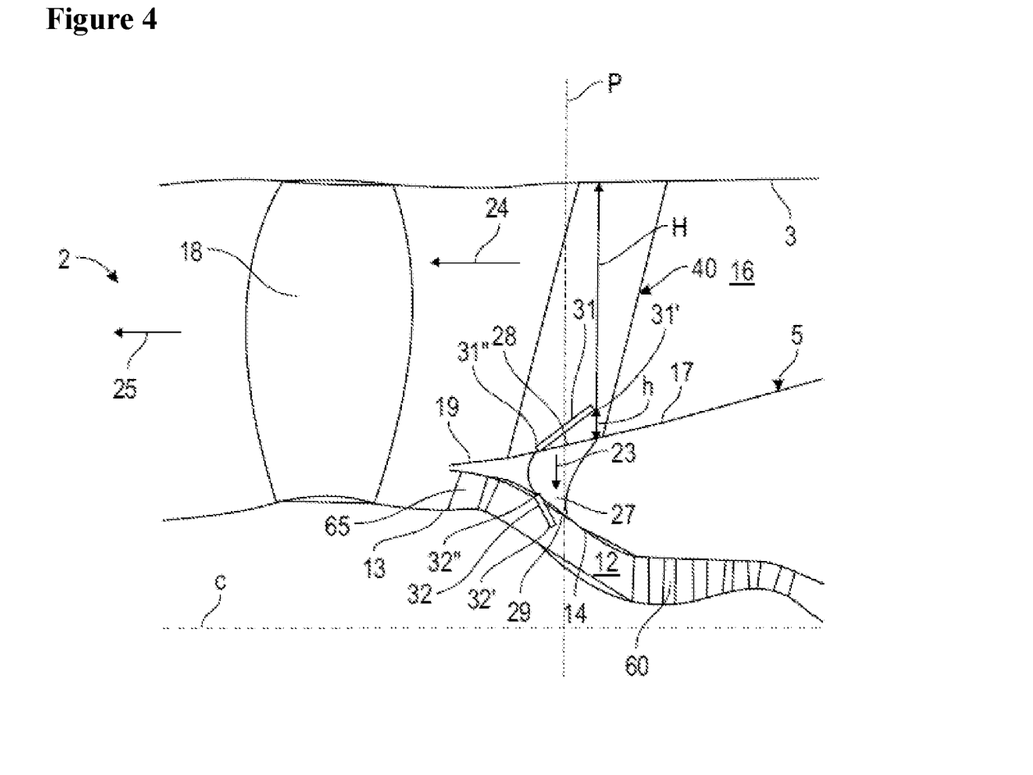
FIG. 4 is a partial schematic view, in longitudinal section, of a variant embodiment of a turbomachine according to the invention.
Figure 5:
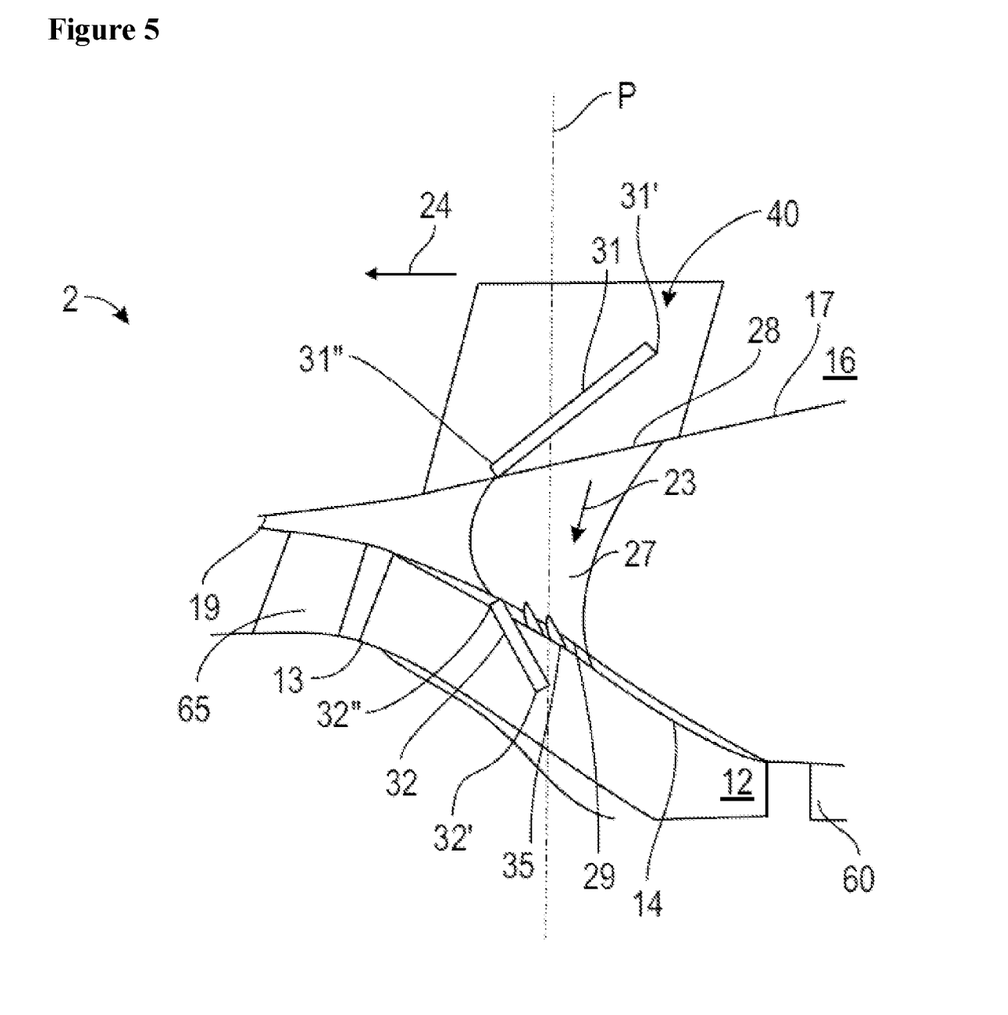
FIG. 5 is a partial schematic view, in longitudinal section, of a variant embodiment of a turbomachine according to the invention.
Figure 6:
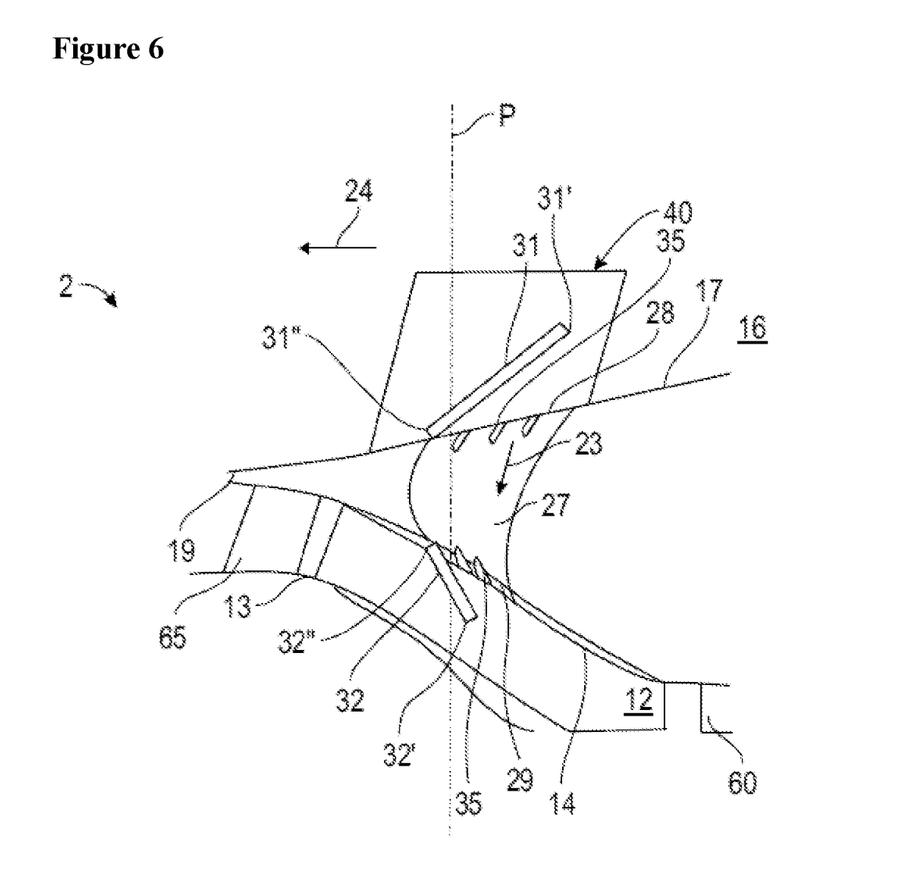
FIG. 6 is a partial schematic view, in longitudinal section, of a variant embodiment of a turbomachine according to the invention.

In the example embodiments shown in FIGS. 4 to 6, the first flaps 31 of the first openings 28 have, for example, a scooping function and are configured to extend at least partially into the secondary duct 16 when in the release position. It is understood here that the first portion 23 of the reverse secondary flow 24 will be captured by the first flaps 31, in particular by an inner face of the first flaps 31, so as to be directed through the outer casing 17 and the inner casing 14 by a conduit 27 until it is distributed in the inner duct 12 by means of the second openings 29. To ensure this scooping function, the first flaps 31 are pivotally mounted in particular on the outer casing 17 by means of their upstream ends 31". They then pivot outward from their closed position to their release position. This configuration allows to facilitate the entry of the flow portion 23 into the primary duct 12. The second flaps 32 may also be pivotally mounted to the inner casing 14 by means of their upstream ends 32". They then pivot inward from their closed position to their release position. Thus, in the release position, the second flaps 32 are configured to extend at least partially into the primary duct 12. The second flaps 32 will thus direct the airflow 23 captured by the first flaps 31 in the normal direction of flow of the airflow in the primary duct 12.

The downstream ends 31' of the first flaps 31, i.e. radially outer when the first flaps 31 are in the release position, are located at a radial dimension h in the secondary duct 16 which represents between 0 and 30% and preferably between 20 and 30% of the total radial dimension H of this duct 16, these dimensions being measured from the outer casing 17 in line with these ends 31'. Similarly, the downstream ends 32' of the second flaps 32, i.e., radially inner when the second flaps 32 are in the release position, are located at a radial dimension in the primary duct 12, this dimension being measured from the inner casing 14 in line with these ends 32'.

Figure 7:
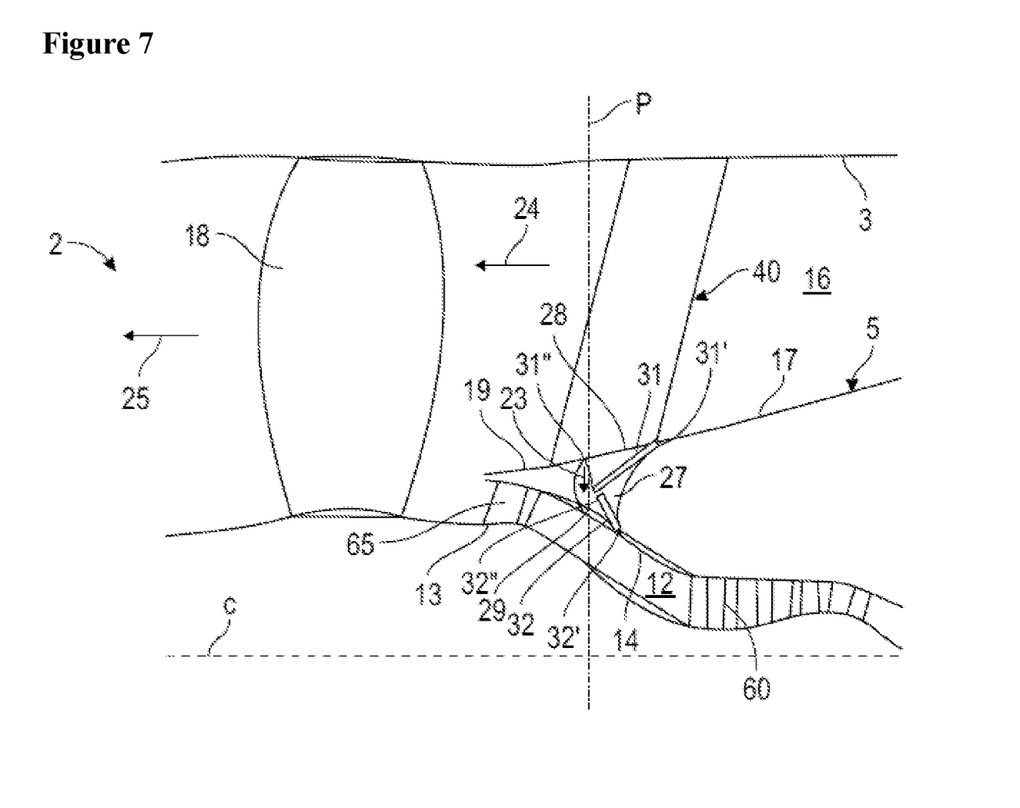
FIG. 7 is a partial schematic view, in longitudinal section, of a variant embodiment of a turbomachine according to the invention.
Figure 8:
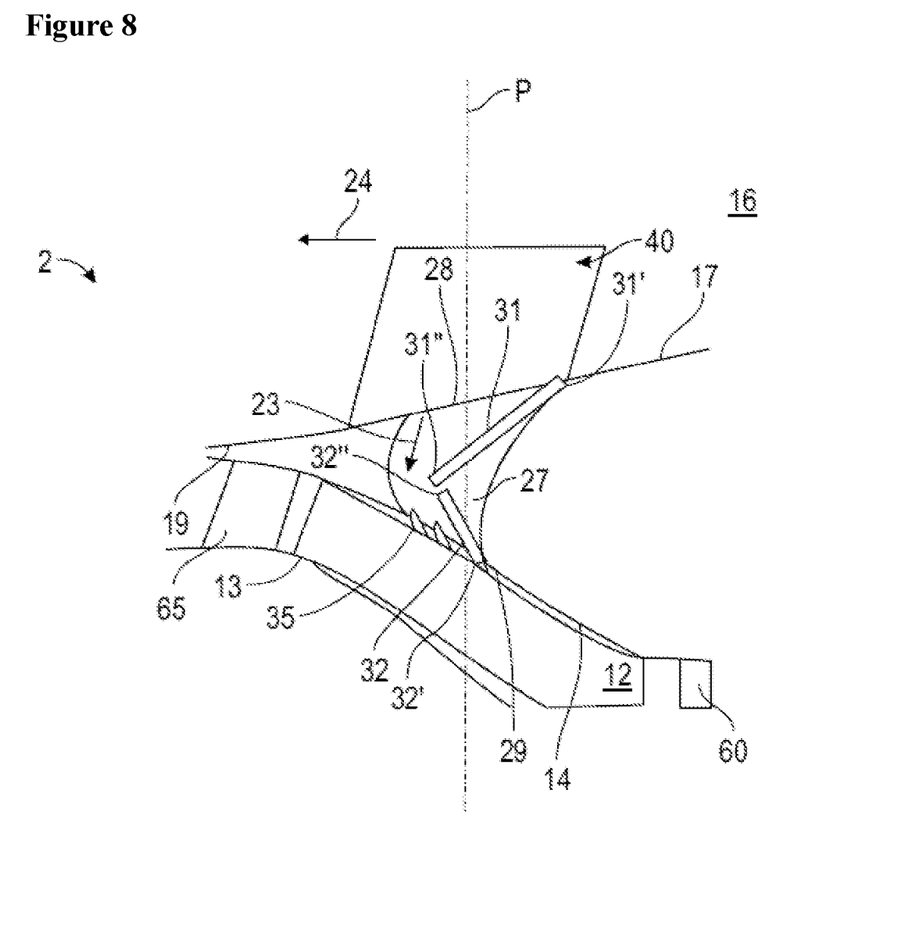
FIG. 8 is a partial schematic view, in longitudinal section, of a variant embodiment of a turbomachine according to the invention.

In the example embodiments shown in FIGS. 7 and 8, the first and second flaps 31, 32 are also pivotally movable between their closed position and their release position. The first flaps 31 are pivotally mounted here with respect to the outer casing 17 at the level of their downstream ends 31'. They then pivot inward from their closed position to their release position so that when in the release position they are housed in the conduit 27. The first flaps 31 therefore do not integrate a scooping function. The second flaps 32 are for example also pivotally mounted with respect to the outer casing 14 at the level of their downstream ends 32'. They then pivot outward from their closed position to their release position so that when in the release position they are housed in the conduit 27. The latter configuration allows to reduce the airflow impacting the variable pitch vanes 18 in the absence of separation.

Figure 9:
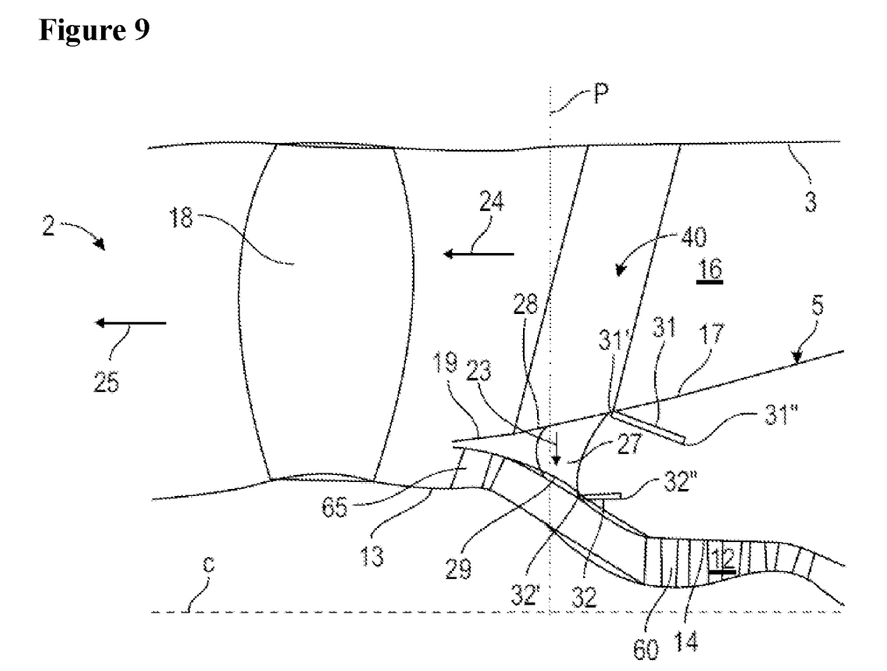
FIG. 9 is a partial schematic view, in longitudinal section, of a variant embodiment of a turbomachine according to the invention.

According to the embodiment shown in FIG. 9, the first and second flaps 31, 32 are always pivotally movable between their closed position and their release position. In particular, the first flaps 31 are in particular pivotally mounted on the outer casing 17 by means of their downstream end 31'. Here they pivot outwards from their closed position to their release position until they are embedded in the outer casing 17 and are no longer present in the secondary duct 16. In the same way, the second flaps 32 are for example pivotally mounted on the inner casing 14 by means of their downstream end 32'. Here they pivot inward from their closed position to their release position until they are embedded in the inner casing 14 and no longer present in the primary duct 12.

Figure 10:
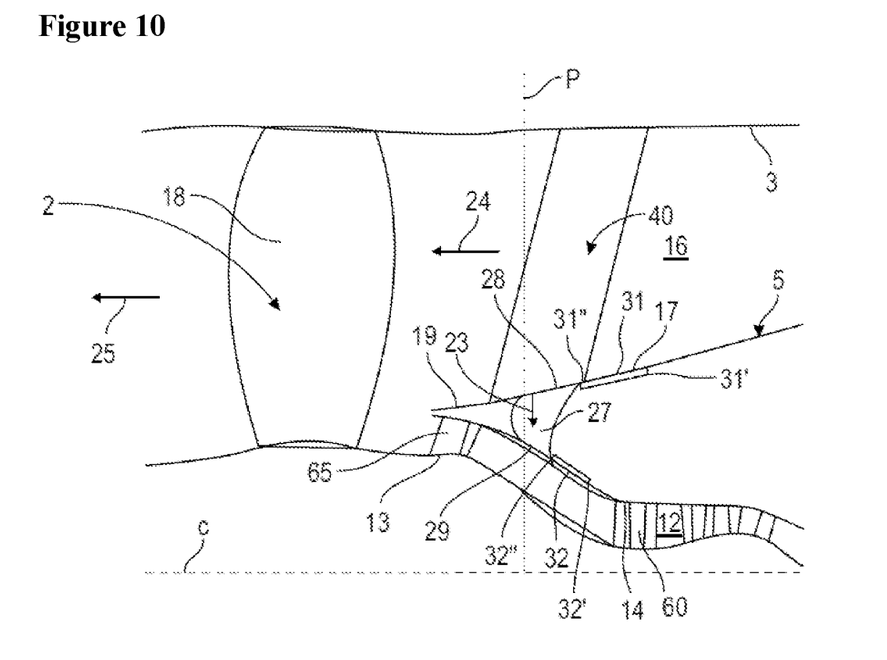
FIG. 10 is a partial schematic view, in longitudinal section, of a variant embodiment of a turbomachine according to the invention.
Figure 11:
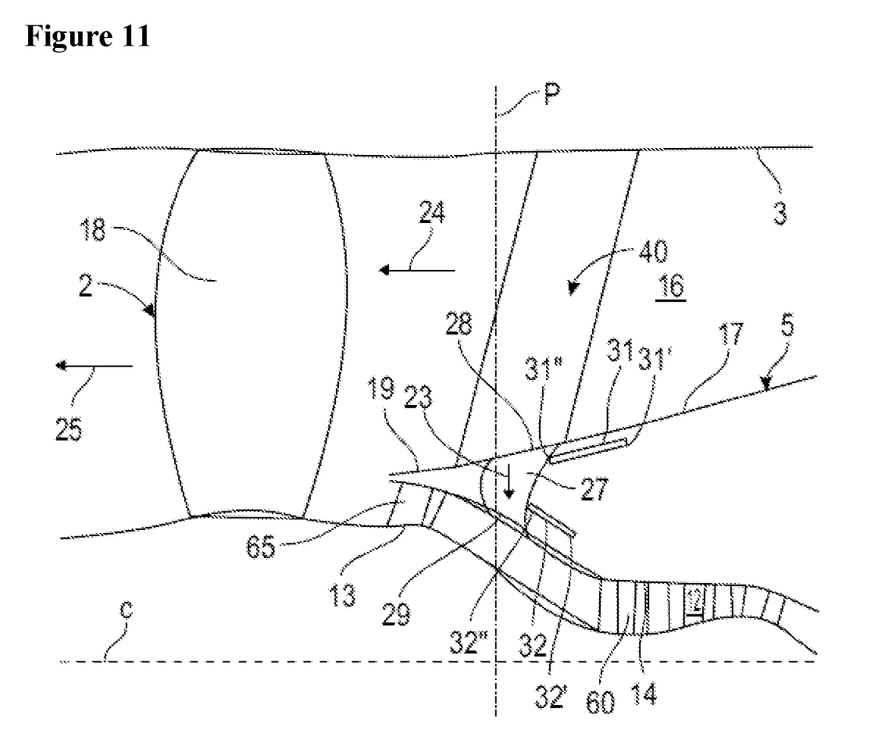
FIG. 11 is a partial schematic view, in longitudinal section, of a variant embodiment of a turbomachine according to the invention.
Figure 12:
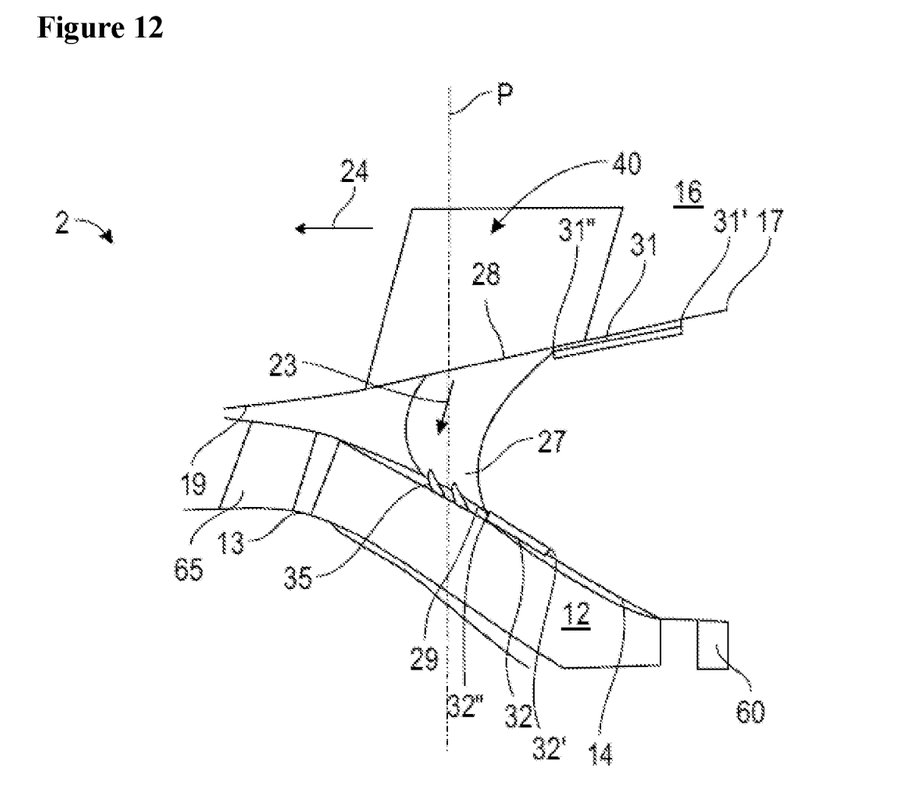
FIG. 12 is a partial schematic view, in longitudinal section, of a variant embodiment of a turbomachine according to the invention.

According to the examples shown in FIGS. 10 and 11, the flaps 31, 32 are for example slidably movable. The flaps 31, 32 are in particular driven in sliding by means of cylinders (not shown).

In the embodiment shown in FIG. 10, the first flaps 31 are in particular configured to slide along a portion of the outer casing 17 as they move from the closed position to the release position. This displacement is in particular from upstream to downstream. The second flaps 32 are configured, for example, to slide along a portion of the inner casing 14 as they move from the closed position to the release position. This displacement is particularly from upstream to downstream.

According to an embodiment shown in FIG. 11, the first flaps 31 are configured to slide by inserting into the outer casing 17 as they move from the closed position to the release position. This displacement is in particular from upstream to downstream. In particular, the second flaps 32 are configured to slide by inserting into the inner casing 14 as they move from the closed position to the release position. This displacement is particularly from upstream to downstream.

According to the illustrated examples, the translations or sliding are from upstream to downstream, but it is understood that the invention covers all the embodiments in which a translation of the flaps 31, 32 is carried out in any direction allowing to release the access to the openings 28, 29, for example from downstream to upstream.

In particular, these sliding solutions allow to improve the flow of the first airflow portion 23 for the gas generator 5 without deteriorating the flow for the variable pitch vanes 18.

Figure 13:
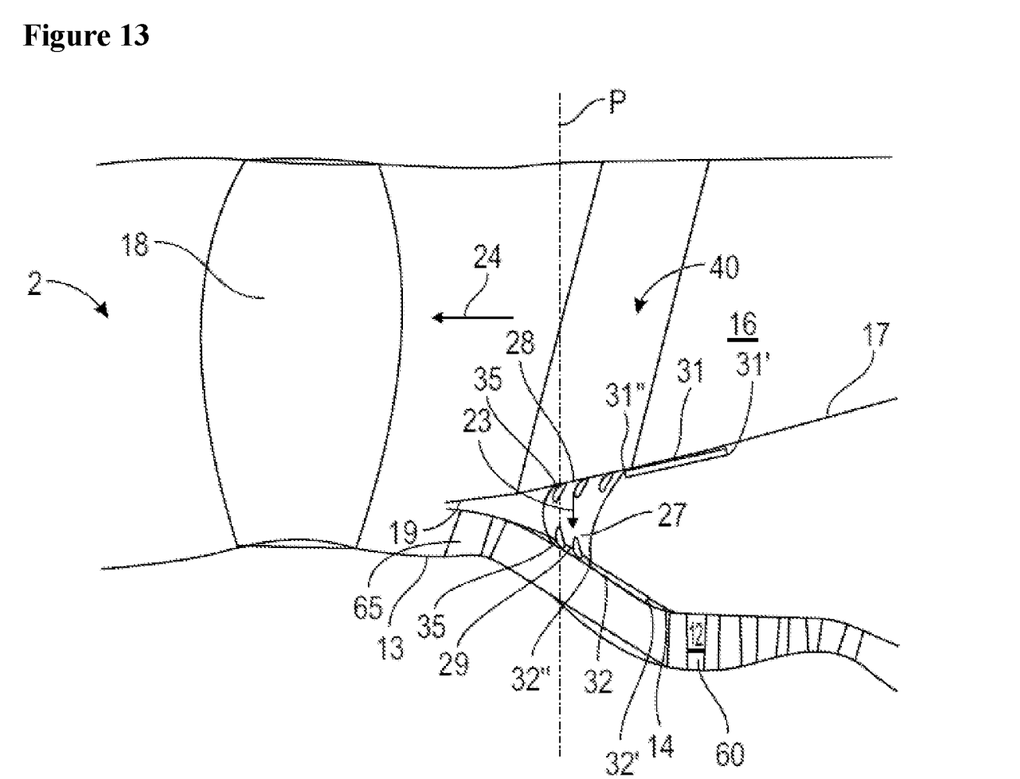
FIG. 13 is a partial schematic view, in longitudinal section, of a variant embodiment of a turbomachine according to the invention.

For example, guide fins 35 (or straightener grids) are located in the first openings 28 (as shown in FIGS. 6 and 13). In particular, the fins 35 are present in the second openings 29 (as shown in FIGS. 5, 6, 8, 12, 13 and 17). They are particularly present between the first 28 and second 29 openings. The main function of these guide fins 35 is to improve the guidance of the first airflow portion 23, as it passes through the conduit 27. The fins 35 allow to better guide the first portion of the air flow 23 because they allow to straighten it before its arrival in the inner duct 12. In particular, they allow to prevent a possible separation when the first portion 23 of the reverse secondary flow 24 passes through the conduit 27. The fins 35 have been illustrated in certain embodiments, but it is obvious that their various configurations mentioned above are applicable to all embodiments of the invention.

In the same way, the invention also covers all the combinations of flaps 31, 32 presented previously, such as, for example, first scooping flaps 31 associated with second non-scooping flaps 32.

Figure 14:
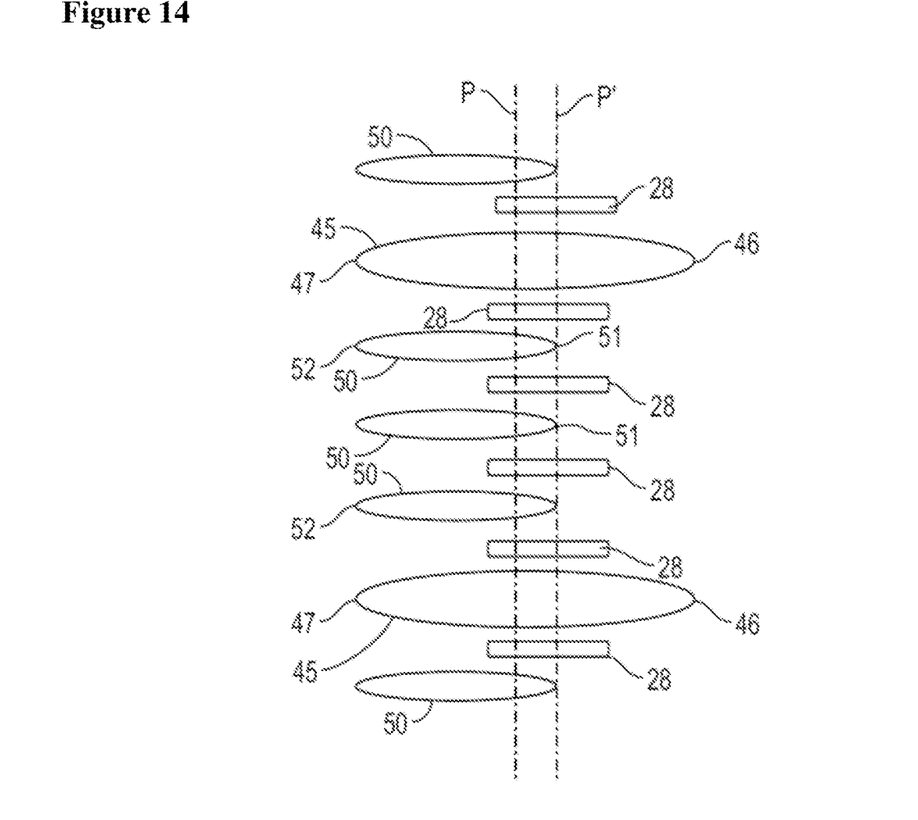
FIG. 14 shows a schematic top view of a stator vane assembly and first openings of a turbomachine according to the invention.

As illustrated in FIG. 14, the stator vane assembly 40 comprises structural arms 45 and flow straightening vanes 50, the arms 45 comprising trailing edges 46 downstream of trailing edges 51 of the vanes 50 with respect to the primary flow. The arms 45 and the vanes 50 also comprise leading edges 47, 52, located upstream of the respective trailing edges 46, 51 of the arms 45 and the vanes 50.

The first openings 28 are located between the arms 45, i.e. circumferentially between the arms 45. They can also be located between an arm 45 and a vane 50. The first openings 28 are also located at least partially downstream of the trailing edges 51 of the vanes 50. The downstream of the trailing edges 51 of the vanes 50 is defined by the area located downstream of the plane P' shown in FIG. 14.

Figure 15:
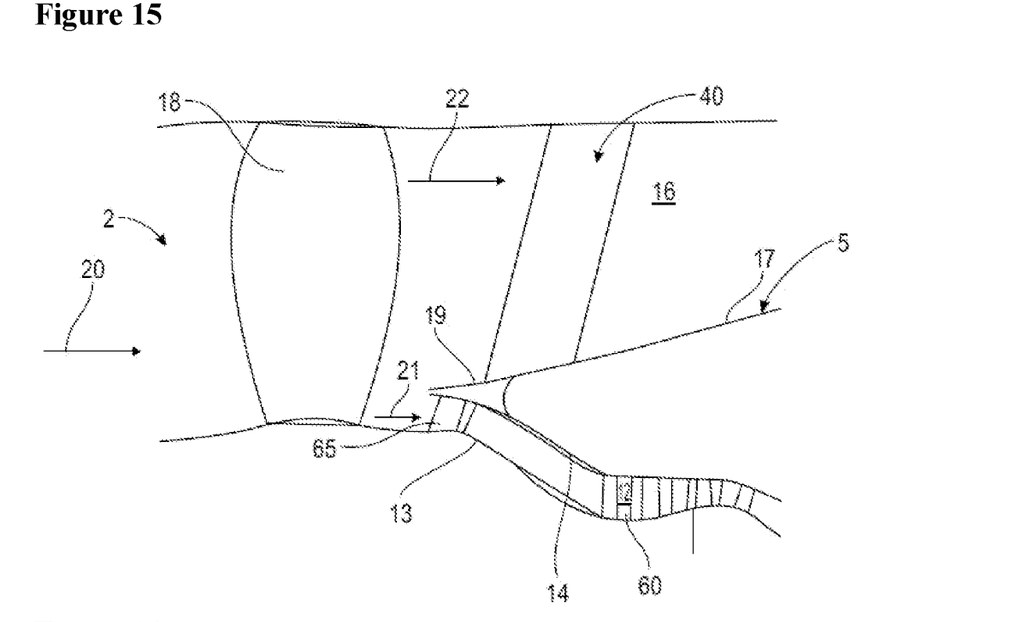
FIG. 15 is a partial schematic view, in longitudinal section, of another embodiment of a turbomachine according to the invention.
Figure 16:
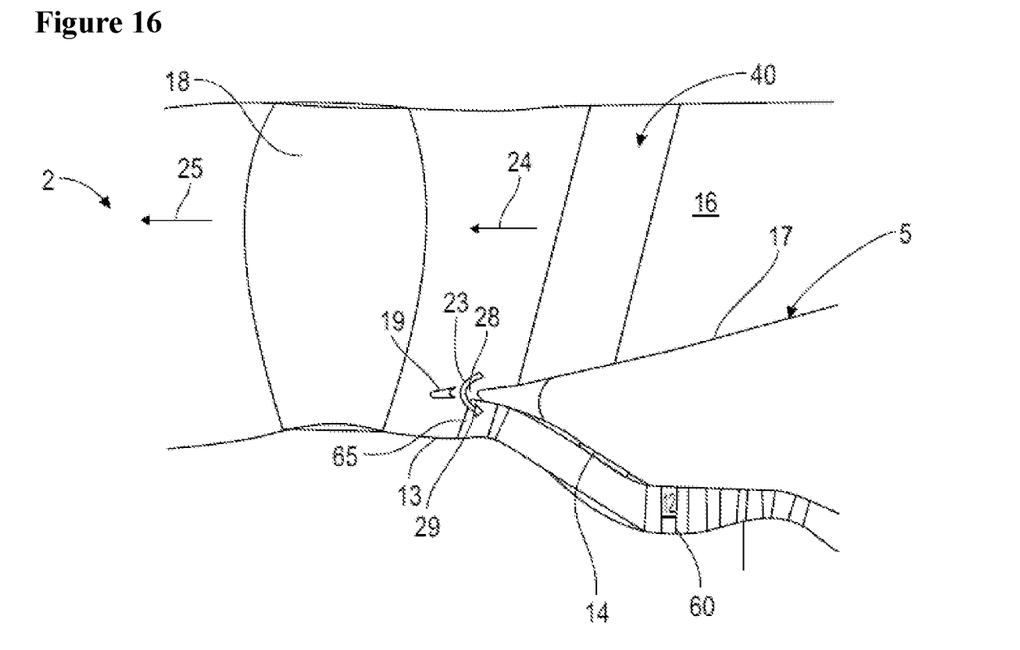
FIG. 16 is a partial schematic view, in longitudinal section, of another embodiment of a turbomachine according to the invention.
Figure 17:
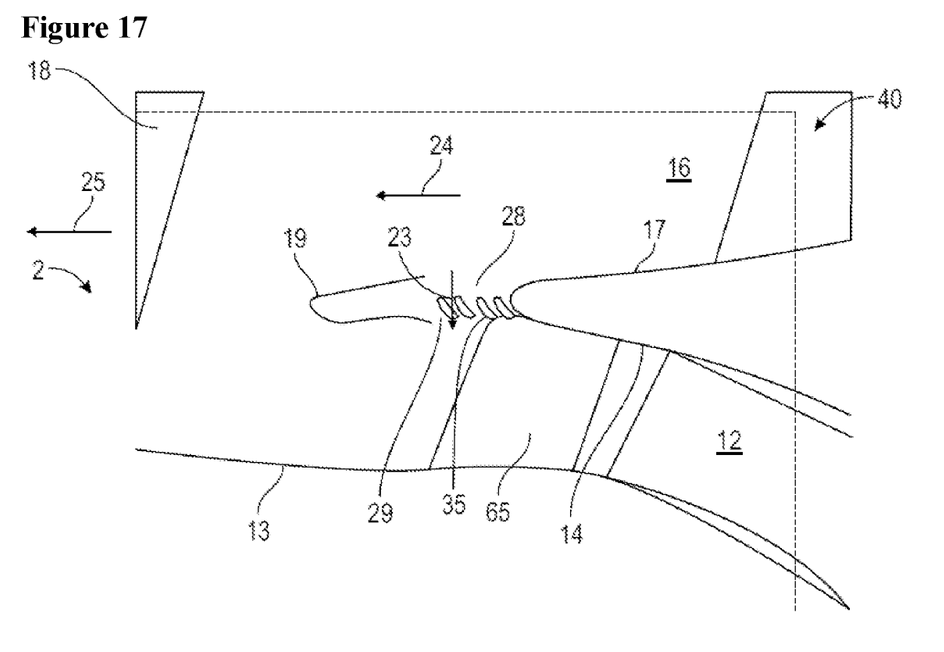
FIG. 17 is a partial schematic view, in longitudinal section, of another embodiment of a turbomachine according to the invention.

As illustrated in FIGS. 15 through 17, the nose 19 can be mobile in translation relative to the inner 14 and outer 17 casing between a closed position (FIG. 14) and a release position (FIGS. 15 and 16). Here, the nose 19 translates upstream between its closed position and its release position so that it creates the first and second openings 28, 29. Fins 35 similar to the one shown above can also be positioned in the first and/or second openings 28, 29 and/or between the latter. The first openings 28 and the second openings 29 may not be located here along the same axial abscissa. In addition, the first openings 28 and the second openings 29 may be located more or less close to the nose 29.

The nose 29 can be translated over 360°, i.e. over its entire circumference, or over discrete angular sectors. In the case where the nose translates 360°, the key parameter for controlling the flow rate of the first portion 23 of the reverse secondary air flow 24 is the length of the translation of the nose. In the discretized case, there will be in addition the angular occupation of the sectors (percentage of translating sectors compared to the fixed sectors). In both of the above embodiments, the choices performed for the various parameters will depend on the flow rate requirement of the gas generator 5 during reverse operation.

The invention claimed is:

1. A bypass turbomachine for an aircraft, the turbomachine comprising a ducted fan and a gas generator, the fan being configured to generate a primary flow of air in a primary duct inside the gas generator and a secondary flow in a secondary duct extending around the gas generator and inside a fan casing, the fan comprising variable pitch vanes which are able to adopt a reverse thrust position driving a flow of a reverse flow of air in the secondary duct the gas generator being connected to the fan casing by a stator vane assembly which passes through the secondary duct, the gas generator comprising two annular casings, outer and inner respectively, extending around each other, the outer casing at least partially internally delimiting the secondary duct and being connected to the stator vane assembly, and the inner casing at least partially externally delimiting the primary duct, the turbomachine further comprising first openings for letting in air from the reverse flow being located on the outer casing, and second openings for letting this air out being located on the inner casing, characterised in that at least one portion of said first openings is located in a plane perpendicular to a longitudinal axis of the turbomachine passing through an area located in the middle of said vane assembly along an axial direction, and in that first flaps and second flaps are provided respectively at the level of said first and second openings and are movable between positions of closure and of release of these openings, said first flaps being pivotably mounted to the outer casing, said seconds flaps being pivotably mounted to the inner casing, said first flaps and second flaps being pivotally movable, having a scooping function and being configured to extend respectively at least partially into said secondary duct and said primary duct when in the release position and so that the radially outer ends of the first flaps are located at a radial dimension in the secondary duct that is between 20 and 30% of the total radial dimension of said secondary duct, said dimensions being measured from the outer casing in line with these ends,
  wherein the stator vane assembly comprises structural arms and flow straightening vanes, the arms comprising trailing edges downstream of the trailing edges of the vanes with respect to said primary flow, said first openings being located between the arms and at least partially downstream of the trailing edges of the vanes, and
  wherein the first openings are located circumferentially between the structural arms and also between the structural arms and the flow straightening vanes.

2. The turbomachine according to claim 1, wherein guide fins are located in said first openings and/or in said second openings and/or between said first and second openings.

* * * * *